(12) United States Patent
Sugaya et al.

(10) Patent No.: US 7,439,691 B2
(45) Date of Patent: Oct. 21, 2008

(54) HIGH PRESSURE DISCHARGE LAMP LIGHTING DEVICE

(75) Inventors: Katsumi Sugaya, Himeji (JP); Izumi Takaya, Himeji (JP); Tomoyoshi Arimoto, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/743,464

(22) Filed: May 2, 2007

(65) Prior Publication Data

US 2007/0262729 A1 Nov. 15, 2007

(30) Foreign Application Priority Data

May 10, 2006 (JP) .............................. 2006-131625

(51) Int. Cl.
*H05B 37/02* (2006.01)
(52) U.S. Cl. .......................... 315/308; 315/224; 315/247
(58) Field of Classification Search ............ 315/209 R, 315/224–226, 246–248, 283, 287, 291, 307–308, 315/360, DIG. 7; 313/595, 600, 620, 631–632
See application file for complete search history.

(56) References Cited

U.S. PATENT DOCUMENTS

| | | | |
|---|---|---|---|
| 5,610,477 A * | 3/1997 | Ivanov et al. ................ 313/573 |
| 6,011,357 A * | 1/2000 | Gradzki et al. ............... 315/224 |
| 6,020,689 A * | 2/2000 | Gradzki et al. ............... 315/224 |
| 6,552,499 B2 | 4/2003 | Derra et al. .................. 315/291 |
| 6,838,838 B2 * | 1/2005 | Okamoto et al. ............. 315/308 |
| 6,984,943 B2 * | 1/2006 | Ono et al. .................... 315/291 |
| 7,049,768 B1 * | 5/2006 | Zhu et al. ..................... 315/307 |
| 7,091,673 B2 | 8/2006 | Okura et al. ................. 315/291 |
| 7,122,960 B2 | 10/2006 | Tukamoto et al. ........... 313/576 |
| 7,385,360 B2 * | 6/2008 | Dluzniak ..................... 315/307 |

FOREIGN PATENT DOCUMENTS

| EP | 0 762 809 A2 | 3/1997 |
|---|---|---|
| WO | 2004/103032 A1 | 11/2004 |

* cited by examiner

*Primary Examiner*—Thuy Vinh Tran
*Assistant Examiner*—Tung X Le
(74) *Attorney, Agent, or Firm*—David S. Safran

(57) ABSTRACT

To shorten the luminous flux rise time and prevent melting/deformation of the projections in the initial ignition period of high pressure discharge lamps that have a sealed mercury volume of no less than 0.20 mg/mm$^3$, a power supply device feeds a current that exceeds the maximum current value of the constant power control period to the high pressure discharge lamp during a first control period from the initial discharge until the lamp voltage reaches a specified lamp voltage and causes a switch to constant power control, and then, during the following period until a change to steady power control, the power supply device feeds it a current that is less than the maximum current during regular operation.

8 Claims, 6 Drawing Sheets

| Power | Current | Light emitter dimensions | | Electrode spacing (mm) | Dimensions (mm) | | | | |
|---|---|---|---|---|---|---|---|---|---|
| (W) | (A) | Outside diameter (mm) | Inside diameter (mm) | | a | b | c | d | e |
| 120 | 1.7 | 9.0 | 4.2 | 1.0 | 0.3 | 6.8 | 1.0 | 0.3 | 2.0 |
| 150 | 2.1 | 9.4 | 4.4 | 1.0 | 0.3 | 6.3 | 1.2 | 0.4 | 2.0 |
| 200 | 2.9 | 9.5 | 4.4 | 1.0 | 0.4 | 7.0 | 1.5 | 0.5 | 2.4 |

Fig. 5

| Voltage VL | Current I2 | | | | | |
|---|---|---|---|---|---|---|
| | 3.5 A | 3.3 A | 3.25 A | 3.2 A | 3.15 A | 3.1 A |
| 25 V | 15 V | 14 V | 14 V | 7 V | 2 V | 0 V |
| | 65 sec | 80 sec | 82 sec | 83 sec | 85 sec | 86 sec |
| 30 V | 15 V | 15 V | 14 V | 8 V | 2 V | 0 V |
| | 65 sec | 75 sec | 76 sec | 75 sec | 78 sec | 80 sec |
| 35 V | 16 V | 15 V | 13 V | 7 V | 3 V | 1 V |
| | 65 sec | 72 sec | 74 sec | 74 sec | 76 sec | 78 sec |
| 40 V | 15 V | 15 V | 14 V | 7 V | 2 V | 2 V |
| | 65 sec | 70 sec | 72 sec | 73 sec | 74 sec | 75 sec |
| 45 V | 17 V | 15 V | 15 V | 6 V | 2 V | 2 V |
| | 55 sec | 67 sec | 70 sec | 72 sec | 73 sec | 72 sec |
| 50 V | 16 V | 15 V | 14 V | 7 V | 3 V | 2 V |
| | 65 sec | 65 sec | 67 sec | 67 sec | 66 sec | 64 sec |
| 65 V | 16 V | 16 V | 14 V | 12 V | 8 V | 9 V |
| | 65 sec | 55 sec | 65 sec | 65 sec | 65 sec | 55 sec |
| 60 V | Constant power | 15 V | 16 V | 14 V | 12 V | 15 V |
| | | 65 sec | 64 sec | 65 sec | 64 sec | 65 sec |
| 65 V | | Constant power | Constant power | Constant power | Constant power | 15 V |
| | | | | | | 64 sec |
| 70 V | | | | | | Constant power |

HIGH PRESSURE DISCHARGE LAMP LIGHTING DEVICE

BACKGROUND OF THE INVENTION

1. Field of the Invention

This invention concerns discharge lamp lighting device. In particular, it concerns a lighting device made up of a very high pressure discharge lamp that contains at least 0.20 mg/mm$^3$ of mercury and operates at a pressure of at least 200 atmospheres, and a power supply device.

2. Description of Related Art

Projector equipment is generally of the type that uses liquid crystal panels and the type that uses DLP®. The method that uses liquid crystal panels has both a one-chip variety and a three-chip variety, but with either variety, the beam emitted from the light source is split into three colors (RGB), and after transmission coordination of the light corresponding to image information in the liquid crystal panel, the three colors that pass through the panels are combined and projected onto a screen.

In the type that uses DLP®, on the other hand, the beam emitted from the light source passes through a rotating filter by which the RGB domains are divided and formed, irradiated by means of time division, such as a space modulation element (what is called a light modulation device, or specifically a DMD (digital micromirror device) element), and specified beams are reflected by the DMD element and projected onto the screen. A DMD element is spread with several million small mirrors, one per pixel, and by controlling the direction of each small mirror, it is possible to control the projection of light.

In comparison with the liquid crystal method, the DLP® method has a simpler optical system and there is no need to use as many as three layers of liquid crystal panel, so that the equipment, as a whole, has the advantage of being smaller and simpler.

High pressure discharge lamps with high mercury vapor pressure are used as light sources for projection equipment. The reason for the high mercury vapor pressure is to enable a high light output in the visible spectrum.

Further, it is know that when high mercury vapor pressure discharge lamps of this sort are operated, projections are formed at the tips of the electrodes. There are also cases where the projections are not formed during operation, electrodes being used on which projections have been formed in advance on the tips of a massive portion at the tip of each electrode by means of cutting or fusing. Whether they are formed during operation or created in advance, these projections have the purpose of stabilizing the arc spot and preventing flicker; they are indispensable for light sources of projector equipment.

On the other hand, projector equipment is expected to project an image as quickly as possible after start-up, and so light sources in which the luminous flux rises in a short time after the beginning of discharge are preferred. The best known method to hasten the rise of luminous flux is provide, from the beginning of discharge, current that exceeds the current value during steady state operation.

In the case of discharge lamps that have projections on the tips of the electrodes, however, there is the problem that providing a large current immediately after the beginning of discharge will melt or deform the projections. Examples of discharge lamps that have projections on the tips of their electrodes can be found in JP-A-2002-245965 that corresponds to U.S. Pat. No. 6,552,449 and JP-A-2004-296427 that corresponds to U.S. Pat. No. 7,122,960.

SUMMARY OF THE INVENTION

The problem to be solved by this invention is that of providing a lighting device in which the luminous flux can rise in a short time without melting or deforming the projections in discharge lamps in which projections are formed on the tips of the electrodes.

To solve this problem, the high pressure discharge lamp lighting device of this invention comprises a high pressure discharge lamp having a pair of electrodes with massive portions at their tips placed facing each other across a gap of no more than 2.0 mm within a light emitting part in which are sealed at least 0.20 mg/mm$^3$ of mercury and a halogen in the range of $10^{-6}$ µmol/mm$^3$ to $10^{-2}$ µmol/mm$^3$, with projections formed at the tips of the massive portions, and a power supply device that feeds alternating current to the discharge lamp, in which the constant current control period (Ti) from the initial discharge until transition to the constant power control period (Tw) has a first control period (T1) until the diameter of the discharge arc begins to be constricted and a second control period (T2) from the point when the diameter of the discharge arc begins to be constricted until transition to the constant power control period (Tw), and the power supply device feeds the high pressure discharge lamp a current (I1) during the first control period (T1) that is greater than the maximum current (Itw-max) fed during the constant power control period (Tw), and feeds a current (I2) during the second control period that is less than the maximum current (Itw-max) fed during the constant power control period (Tw).

Further, the first control period (T1) is the period until the discharge arc diameter is constricted to a value that is the average of the maximum value of the discharge arc diameter during the first control period (Dti-max) and the discharge arc diameter during the constant power control period (Dtw).

Further, the first control period (T1) is the period until the lamp voltage reaches a designated value.

Further, the first control period (T1) is the period until the lamp voltage reaches 50 V.

Further, the current (I2) has a value not exceeding 95% of the maximum current (tw-max) supplied during the constant power control period (Tw).

By means of the constitution described above, this invention has the following operational effects.

First, until the discharge arc begins to be constricted, and preferably until the diameter of the discharge arc is constricted to a value that is an average of the maximum value during the constant power control period and the value of the diameter during steady state operation, the discharge lamp is fed a current that is larger than the maximum current supplied during constant current control, so that the rise time of the luminous flux can be shortened.

Second, once the discharge arc begins to be constricted, the discharge lamp is fed a current that is smaller than the maximum current supplied during the constant power control period, so that the projections on the tips of the electrodes do not melt or deform and it is possible to provide a high pressure discharge lamp lighting device in which the arc spot of the discharge lamp is stable.

BRIEF DESCRIPTION OF THE DRAWINGS

FIG. 5 is a chart of results of experiments performed with this invention.

DETAILED DESCRIPTION OF THE INVENTION

Figure 1:
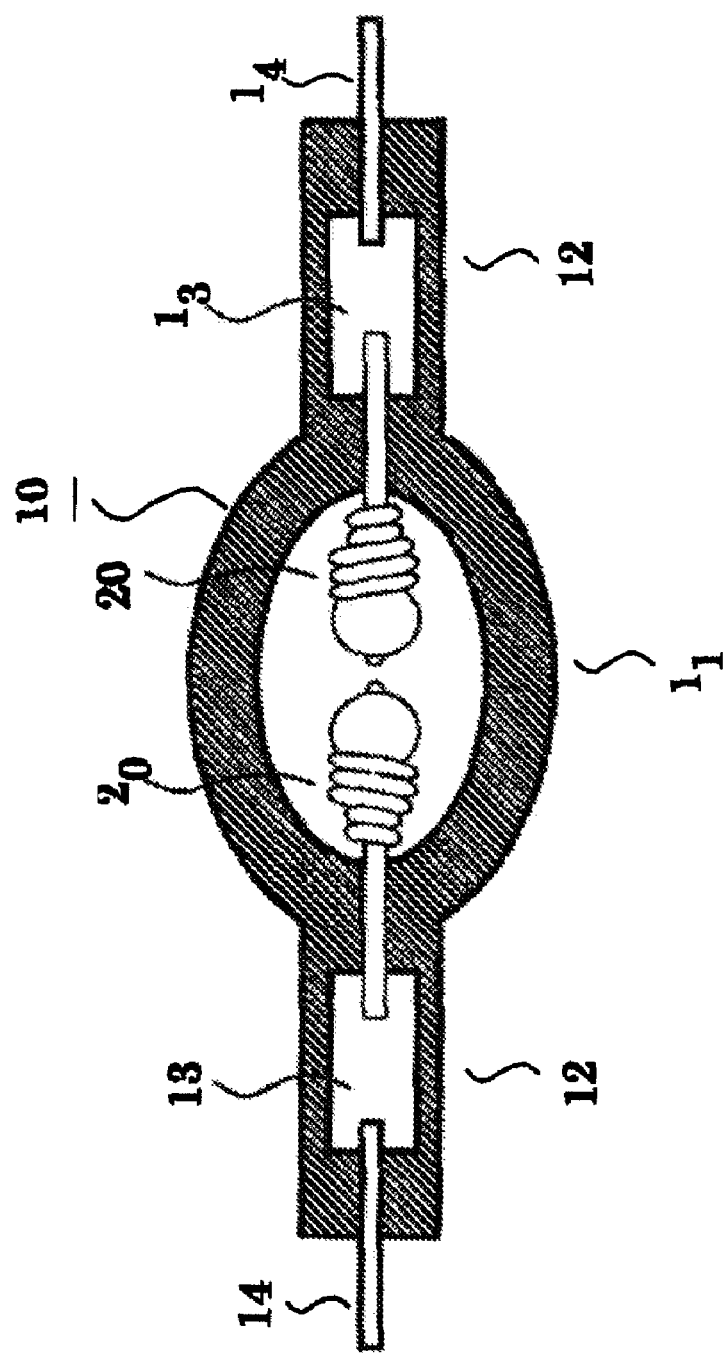
FIG. 1 is a longitudinal cross-sectional view of the high pressure discharge lamp of this invention.

FIG. 1 shows a high pressure discharge lamp 10 that has a roughly globular light emitting part 11 formed with a quartz glass discharge chamber. Positioned within this light emitting part 11 is a pair of electrodes 20 that have massive portions at their tips which face across a gap of no more than 2.mm. Further, sealed portions 12 are formed at both ends of the light emitting part 11. Metal conducting foils 13 made of molybdenum are enclosed within the sealed portions 12 and kept airtight by, for example, shrink seals. One end of the metal foil 13 is connected to the shaft of the electrode 20, and the other end of the metal foil 13 is connected to an outer lead by means of which power can be fed from an external power supply device. There is a projection, described below, formed on the tip of the electrode 20 (facing the other electrode). This projection can be formed spontaneously as the lamp operates or it can be formed in advance during the process of manufacturing the electrode.

Mercury, a rare gas, and a halogen gas are sealed in the light emitting part 11. The mercury enables a projection beam in the necessary visible light wave lengths, for example, 360 to 780 nm; at least 0.20 mg/mm$^3$ of mercury is included. The amount included will differ in accordance with the temperature conditions, but there will be very high vapor pressure exceeding 200 atmospheres during operation. By including even more mercury, it is possible to build discharge lamps with mercury vapor pressures exceeding 250 atmospheres or 300 atmospheres; the higher the mercury vapor pressure is, the better suited the light source will be for use in projection equipment.

About 13 kPa of a rare gas, such as argon, can be included. Its function is to improve the lighting start-up characteristics. The halogen, such as iodine, bromine, or chlorine, is included in the form of a compound with mercury or another metal. The amount of halogen included can be selected in a range from $10^{-6}$ μmol/mm$^3$ to $10^{-2}$ μmol/mm$^3$. The function of the halogen is to lengthen the service life using what is called the halogen cycle. However, it also acts to prevent devitrification in discharge lamps like that of this invention, which are very small and have very high vapor pressure when lit.

As a quantitative example of a discharge lamp, one could have a light emitting part with a maximum outside diameter of 9.5 mm, an electrode separation of 1.0 mm, and an inside volume of the arc tube of 75 mm$^3$, lit using alternating current with a rated voltage of 70 V and a rated power of 200 W.

Further, a discharge lamp of this type is housed in reduced-size projection equipment, and so must have very small overall dimensions but high luminosity. Because of that, the effect of temperature within the light emitting part will be very severe. The bulb wall load value will be between 0.8 and 2.0 W/mm$^2$, specifically 1.5 W/mm$^2$.

When mounted in projector equipment or in presentation equipment, such as an overhead projector, a discharge lamp having this type of high mercury vapor pressure and bulb wall load value will provide light with good color rendering properties.

Figure 2:
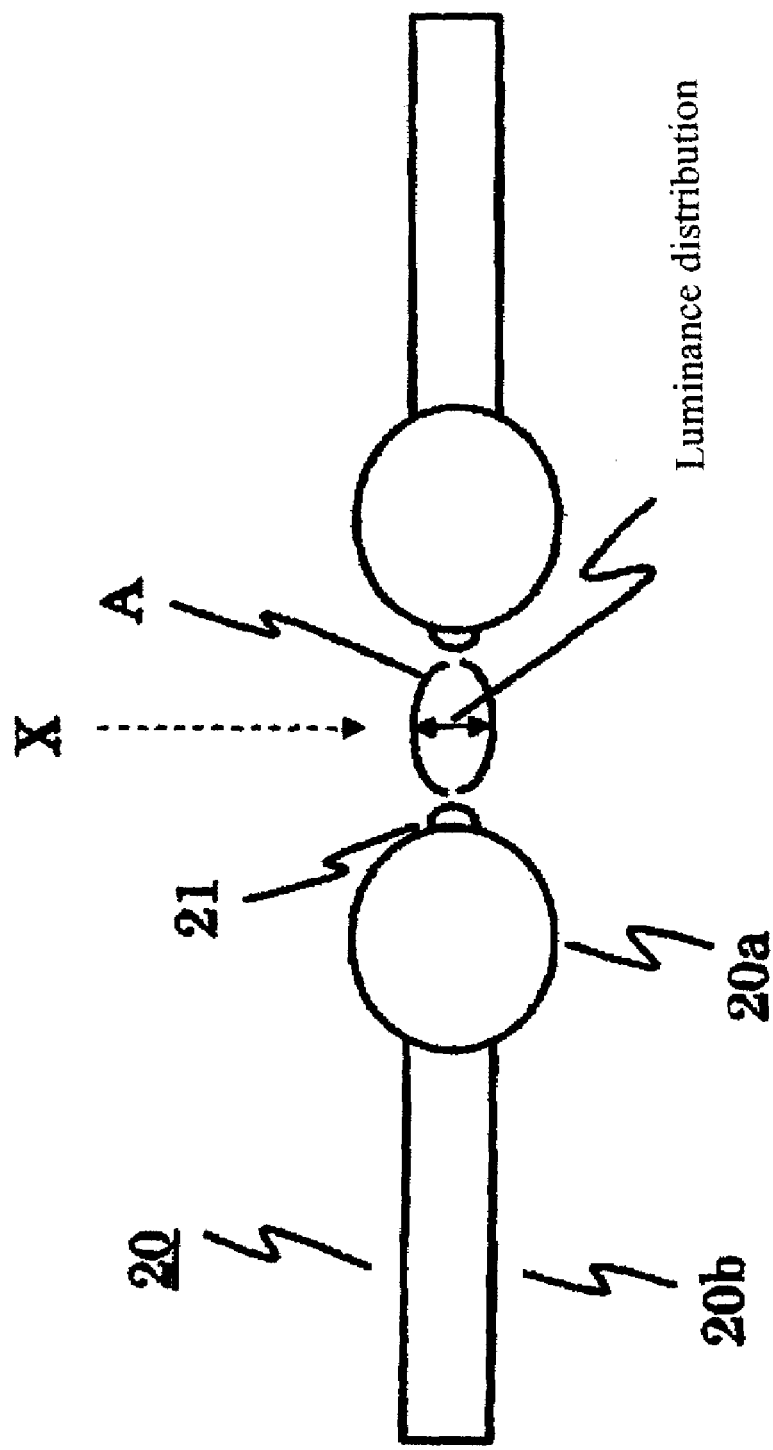
FIG. 2 is a diagrammatic representation of the electrodes of the high pressure discharge lamp of this invention.

FIG. 2 is a stylized representation of the tip of the electrodes 20 shown in FIG. 1. Electrode 20 comprises a massive portion 20a and a shaft portion 20b, and a projection 21 formed on the tip of the massive portion 20a. The projection 21 can be produced or grown spontaneously in the course of operation of the lamp, or the tip can be formed in advance in the manufacturing process.

Now, to give a quantitative example of the size of the projection, if the maximum diameter of the electrode (measured perpendicular to the direction of discharge) is 1.0 to 1.5 mm, the electrode separation is 1.0 to 1.5 mm, and the diameter of the projection 21 will be about 0.2 to 0.6 mm.

The projection 21 is indispensable for a discharge lamp like that of this invention, which has an electrode separation of up to at most 2 mm and contains at least 0.20 mg/mm$^3$ of mercury and is used as a light source for projector equipment. This is because, in discharge lamps that contain 0.20 mg/mm$^3$ of mercury, in which the operating pressure reaches 200 atmospheres or more, the arc discharge is tightly constricted and the starting point of the discharge is also constricted.

Therefore, when the projection of an electrode has melted or deformed, the discharge starting point moves around in small steps, which leads to the problem of flickering of the screen image from the projector equipment. Particularly when the arc spot is 0.5 mm or less, as formed by an electrode separation not exceeding 2 mm, even the slightest movement tends to cause fatal flickering in the screen image.

Further, discharge lamps in which projections are formed at the tips of the electrodes have the advantage that the arc discharge is produced with the projection as the starting point and there is little obstruction of light from the arc by the tip of the electrode (particularly the massive portion), and so the utilization efficiency of the light is improved and a brighter image is produced.

Figure 3:
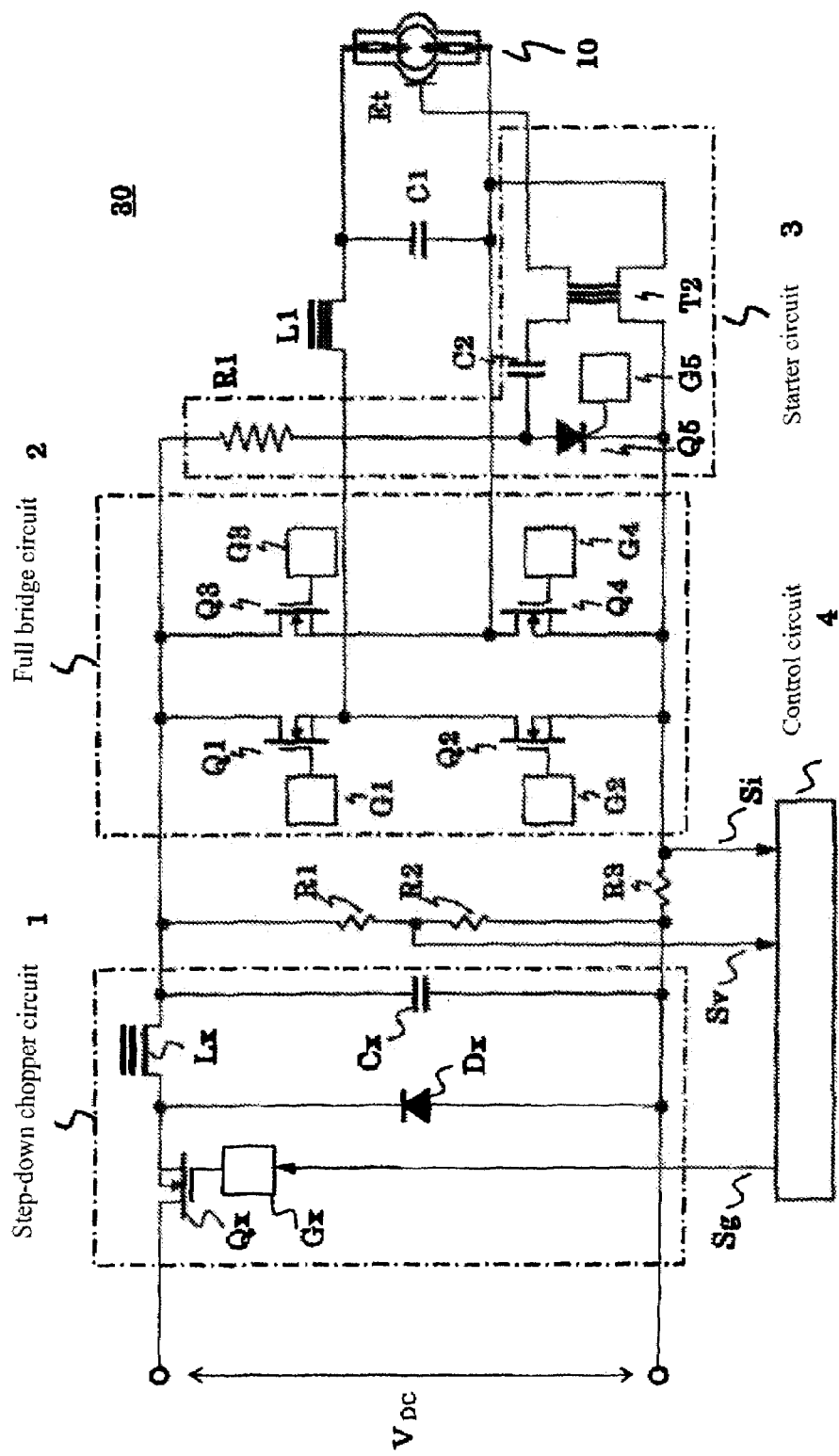
FIG. 3 is a circuit diagram of the power supply device of the high pressure discharge lamp lighting device of this invention.

FIG. 3 shows the power supply device 30 that lights the discharge lamp described above. The power supply 30 comprises a step-down chopper circuit 1 that supplies direct current voltage, a full-bridge inverter circuit 2 (hereafter, "full-bridge circuit") that connects to the output side of the step-down chopper circuit 1, converts the direct current voltage to alternating current voltage, and feeds it to the discharge lamp 10, and a coil L1, capacitor C1 and a starter circuit 3 connected in series with the discharge lamp 10.

The step-down chopper circuit 1, the full-bridge circuit 2, and the starter circuit 3 make up the power supply device 30, and together with the discharge lamp 10 is called the lighting device.

The step-down chopper circuit 1 is connected to the direct current power source Vdc, and comprises a switching element Qx, a diode Dx, a coil Lx, a smoothing capacitor Cx, and a drive circuit Gx that drives the switching element Qx. The switching element Qx is turned ON and OFF by the drive circuit Gx. The duty cycle of the switching element Qx is regulated by means of that driving, and in that manner the current or power feed to the discharge lamp 10 is controlled. That is, the switching element Qx is feedback controlled by a control circuit 4, through the drive circuit Gx, on the basis of the voltage signal Sv detected by resistances R1, R2 and the current signal Si detected by R3. By this means, the lamp current receives constant current control at a designated value during the initial lighting period, and the lighting power of the lamp receives constant power control during steady state operation.

The control circuit 4 contains a circuit structure for constant current control, a circuit structure for constant power control, and a circuit structure to switch between them. Further, it has a mechanism to change the current value which is the standard in the circuit structure for constant current control. Moreover, the constant power control circuit has a circuit structure to fix the power value, and there is a limiter function so that the current value does not exceed the determined maximum value. That is, to prevent the lamp current from becoming extremely high in the event that, for some reason, the lamp voltage drops while in a state of constant power control. This designated upper limit will be called, hereafter, the maximum current value (Itw-max).

The full-bridge circuit 2 comprises transistor or FET switching elements Q1 through Q4 connected in a bridge configuration and drive circuits G1 through G4 for the switching elements Q1 through Q4. The switching elements Q1 through Q4 can have diodes in parallel connected in reverse parallel, but the diodes are omitted in this embodiment.

These switching elements Q1 through Q4 are driven by drive circuits G1 through G4 through controllers that are not illustrated.

The operation of the full-bridge circuit 2 repeats the ON and OFF states alternation for switching elements Q1, Q4, on the one hand, and switching elements Q2, Q3 on the other. When the switching elements Q1, Q4 are ON, the current flows along the path: step-down chopper circuit 1→switching element Q1→coil L1→discharge lamp 10→switching element Q4→step-down chopper circuit 1. When the switching elements Q2, Q3 are ON, the current flows along the path: step-down chopper circuit 1→switching element Q3→discharge lamp 10→coil L1→switching element Q2→step-down chopper circuit 1. In this way, an alternating, rectangular wave-form current is supplied to the discharge lamp 10.

The starter circuit 3 comprises a switching element Q5, a drive circuit G5, a resistance R1, a capacitor C2, and a transformer T2. When the discharge lamp 10 is to start up, the switching element Q5 turns on and the energy with which the capacitor C2 is charged is impressed on the transformer T2, boosting the voltage so that a high voltage is impressed on the lamp and starts it up. This embodiment uses the "external trigger" method in which there is a conductor to the outside surface of the discharge lamp 10 for use in impressing the high voltage.

Figures 4A, 4B:
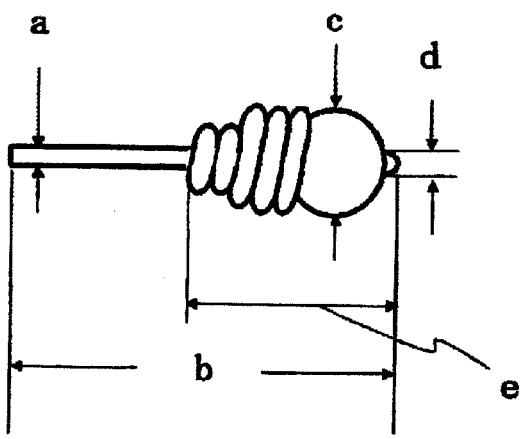
FIGS. 4(a) & 4(b) shows an example of electrode dimensions in the discharge lamp of this invention and a chart of various characteristics for it, respectively.

FIG. 4(a) is an enlarged view showing the structure of the electrode 20 shown in FIG. 1, and 4(b) is a chart of the dimensions for various rated power levels.

The discharge lamp is fed controlled current by the power supply device 30, but after discharge begins, there is first constant current control with a fixed current value (the constant current control period Ti), and then a transition to constant power control in which the power value is fixed (the constant power control period Tw). Moreover, the constant current control period Ti comprises a first control period (T1) in which a larger current I1 is supplied to the discharge lamp and a second control period (T2) when the current value is dropped and a smaller current (I2) is supplied in situations that would bring about loss of the projections.

Thus, the invention of this application is characterized by controlled switching of current values in the constant current control period (T1) from the perspectives of rapid rise of the luminous flux and projection loss (melting or deformation). That is, it is possible to supply a larger current (I1) within a range that will not bring about loss of the projections, and also to drop the current value and supply a smaller current (I2) in situations that would bring about loss of the projections.

Next, the operation of the power supply from the beginning of discharge until the transition to the constant power control period will be explained taking the example of lighting a discharge lamp rated at 200 W.

In the discharge lamp 10, the transformer 2 of the starter circuit 3 generates a high voltage pulse and initiates dielectric breakdown. Accompanying that, the discharge current begins to flow and the control circuit 4 begins constant current control. The lamp current value (I1) at this time, if the maximum current during constant power control (Itw-max) is 3.3 A, for example, is a higher value of 3.5 A. By means of this greater supplied current, it is possible to reduce the luminous flux rise time of the lamp. The period during which this lamp current (I1) is supplied is the first control period (T1).

Then, with the passage of operating time, when the lamp voltage (VL) reaches a designated value, perhaps 50 V, the control circuit 4 switches to a current value that is lower than the maximum current during constant power control (Itw-max), such as 3.15 A. This prevents melting or deformation of the projections formed on the electrode tips. The period during which this lamp current (I2) is supplied is the second control period (T2).

Moreover, if the lamp voltage (VL) rises to about 63.5 V, the lamp power (WL) will reach 200 W (3.15 A×63.5 V) and there will be a change from constant current control to constant power control.

An experiment concerning this invention will be explained next.

The experiment made various investigations of the timing of the switch from the first control period (T1) to the second control period (T2), and of the current value during the second control period (T2).

The discharge lamp used in this experiment was that described above, specifically, a 70 V rated voltage, 200 W rated power high pressure mercury lamp with a 9.5 mm outside diameter light emitting part. The maximum current value (Itw-max) during the constant power control period (Tw) was 3.3 A.

In this experiment, consideration was given to the ratio between the current value during the second control period (T2) and maximum current value (Itw-max) during the constant power control period (Tw). The current value (I1) during the first control period (T1) was fixed at 3.5 A, and the switch from constant current control to constant power control was made when the lamp voltage (VL) rose to the point where the lamp power became 200 W.

Here, the lamp voltage (VL) was taken as the standard for the time of the switch from the first control period (T1) to the second control period (T2). The switch was made when the lamp voltage reached a designated value (changing in 5 V increments in the range from 25 V to 70 V, specifically 25 V, 30 V, 35 V, 40 V, 45 V, 50 V, 55 V, 60 V, 65 V, 70 V). There is a true correlation between the lamp voltage and the mercury vapor pressure, and the status of the arc is determined by the mercury vapor pressure. For that reason, the method of switching with the lamp voltage (VL) as a standard can be taken as technically equivalent to switching with the status of the discharge arc as a standard.

The current value in the second control period (T2) was changed in increments of 0.5 A from 3.1 A to 3.5 A. The specific settings used were 3.5 A, 3.3 A, 3.25 A, 3.2 A, and 3.15 A. Because the maximum current value during the constant power control period was 3.3 A, the current value (I2) of 3.5 A was 106% of the current value (Itw-max), the current value (I2) of 3.3 A was 100% of the current value (Itw-max), the current value (I2) of 3.25 A was 98.5% of the current value (Itw-max), the current value (I2) of 3.2 A was 97.0% of the current value (Itw-max), the current value (I2) of 3.15 A was 95.4% of the current value (Itw-max), and the current value (I2) of 3.1 A was 94.0% of the current value (Itw-max).

Thus, the experiment measured 10 patterns for the timing of the switch from the first control period (T1) to the second control period (T2), for a total of 60 patterns.

The measurements were of the rise time of the luminous flux and the degree of projection loss (melting or deformation). Specifically, luminous flux rise time was measured in terms of the time from the beginning of discharge until 90 percent of luminous flux in the constant power control period was achieved. An illuminometer (Minolta T-10) was used to measure luminous flux. The degree of projection loss was measured in terms of the increase of measured lamp voltage relative to the basic lamp voltage (Vb). That is, because electrode separation increases and the lamp voltage increases when there is loss from the projections.

In this case, the basic lamp voltage (Vb) was measured in advance using a lamp that was the same as the lamp being measured, so after a current of 3.1 A was applied in the constant current control period (Ti) and the transition to the constant power control (Tw), the voltage at that time was taken as the basic lamp voltage (Vb) of each lamp. Then, the degree of projection loss was measured by measuring how much the lamp voltage of the lamp being measured rose relative to the basic lamp voltage (Vb) of that lamp.

Observation was also made of the state of the electrode tips of each lamp following transition to the constant power control period (Tw). This observation consisted of using a convex lens to project and observe the discharge arc image and to check visually the presence of projection melting or deformation and movement of the arc calescence point.

FIG. 5 shows the results of the experiment. The left-most column shows the lamp voltage VL at the switch from the first control period (T1) to the second control period (T2), and the top most row shows the current values (I2) during the second control period (T2). In each of the block specified by the intersection of a current value column and lamp voltage row, the top value is the increase of lamp voltage that indicates the degree of projection loss, and the bottom value is the luminous flux rise time (in seconds).

For example, the intersection of "25 V" and "3.5 A" means that the switch from the first control period (T1) to the second control period (T2) was made when the lamp voltage reached 25 V, and the lamp current (I2) after the switch was maintained at 3.5 A. In this case, the "15 V" in the top of the specified block means that the measured lamp voltage was 15 V higher than the basic lamp voltage (Vb) at which there would be no projection loss, and the "65 sec" below that indicates that the luminous flux rise time was 65 seconds.

Now, in this figure, "Constant power" means that the rated power of 200 W was reached during the first control period (T1); that is, there was no second control period (T2). For example, at the intersection of "60 V" and "3.5 A," the switch to the second control period (T2) should be made when the lamp voltage reached 60 V, but because the rated power of 200 W was reached when the lamp voltage was 57.1 V (57.1 V×3.5 A=200 W), at that point, there was a transition from the first control period (T1) directly to constant power control (Tw). It is known that such a phenomenon occurred because various measurements were made in the experiment.

With regard to the lamp voltage (VL), looking at the 25 V row, when the current value (I2) was 3.5 A, the lamp voltage (VL) during the constant power control period (Tw) is shown as 15 V higher than the basic lamp voltage (Vb). Similarly, when the current value (I2) was 3.2 A, the lamp voltage (VL) during the constant power control period (Tw) is shown as 7 V higher than the basic lamp voltage (Vb), and when the current value (I2) was 3.15 A, the lamp voltage (VL) during the constant power control period (Tw) is shown as 2 V higher than the basic lamp voltage (Vb). It is not clear from this experiment alone how much projection melting or deformation occurred at what voltage increase relative to the basic lamp voltage (Vb), but when these results were evaluated in combination with visual observation, it was determined that projection melting or deformation occurred when the increase was 6 V or more.

This experiment led to the following points.

First, in order to prevent melting and deformation of the projections formed on the electrode tips, the current value (I2) during the second control period (T2) should be 3.15 A or less. That is because, when the voltage value (I2) is 3.2 A or more, melting or deformation of the projections occurred in all cases, regardless of the timing of the switch from the first control period (T1) to the second control period (T2). It is thought that the current value (I2) in the second control period (T2) is so great that the size of the current value (I2) causes melting or deformation of the projections no matter how long the first control period (T1) is.

In the event that the current value (I2) is 3.15 A or less, melting or deformation of the projection is prevented if the switchover lamp voltage is no more than 50 V. It is thought that when the switchover lamp voltage exceeds 50 V, the first control period (T1) will be too long, and melting or deformation of the projections will be caused by the current value (I1). To represent this finding as a ratio of the current value (I2) and the maximum current value (Itw-max) during the constant power control period (Tw), if the current value (I2) is no more than 95% of the current value (Itw-max) (3.15 A/3.3 A=95%), the projections will be unaffected.

Now, when the current value (I1) of the first control period (T1) exceeds 3.5 A, that factor alone will tend to bring on melting or deformation of the projections. Accordingly, in the event that the current value (I1) of the first control period (T1) is stipulated as a proportion of the maximum current value (Itw-max) of the constant power control period (Tw), keeping that current value (I1) at a level no greater than 106% of the maximum current value (Itw-max) (3.5 A/3.3 A=106%) will avoid melting or deformation.

Second, it was learned that the luminous flux rise time will be fast enough if the standard for switching to the second control period is a lamp voltage of at least 50 V.

That is, because in this experiment the rise time was 65 seconds when the maximum current that could be supplied was 3.5 A, and as long as the switch from the first control period (T1) to the second control period (T2) was made with a lamp voltage of 50 V or more as the standard, the rise time was about 65 seconds no matter what the current value (I2) during the second control period (T2).

That means that a rapid luminous flux rise time can be realized, without regard to the current level (I2) during the second control period (T2), by setting the first control period (T1) as the time for the lamp voltage to reach at least 50 V.

In this experiment, lamp voltage was adopted as the benchmark for the switch from the first control period (T1) to the second control period (T2) within the constant current control period (T1). This is based on the idea that the heat gain at the electrode tip depends on the status of the discharge arc, which status is manifest in the lamp voltage. The relationship between the discharge arc and the lamp voltage is the same as long as mercury vapor is the primary material sealed into the light emitting part, so the lamp voltage numbers obtained in this experiment can be applied to high pressure mercury lamps that differ in such things as rated power.

Another experiment will be explained next.

To investigate the relationship between the status of the discharge arc and the lamp voltage, changes in the lamp voltage and arc diameter were measured in the period from the beginning of lamp discharge until steady burning (the constant power control state).

The discharge lamps used had the same specifications as in the previous experiment. The arc diameter was the full width half maximum measurement of the luminance distribution in the perpendicular direction (shown as the X direction in FIG. 2) of the central portion of the discharge arc (the center of the gap between electrodes, or more strictly, the center of a line connecting the two projecting tips) as seen from the side of the arc (the normal direction with respect to the surface of the paper) shown in FIG. 2.

The experiment was carried out by placing a CCD camera (Sony XC-003) straight to the side of horizontal discharge lamps and processing the shape of the discharge arc by computer.

Then, changes in lamp voltage and changes in arc diameter with the passage of time after the beginning of discharge were measured. The target lamp used for measurement had 3.5 A as the current value (I1) of the first control period (T1) and a lamp voltage of 50 V as the timing of the switchover. Now, the lamp voltage rising curve of the target lamp was unaffected by the length of the first control period (T1) or the second control period (T2), the current value (I1), or the current value (I2), so these values were not the essence of the experiment.

Figure 6:
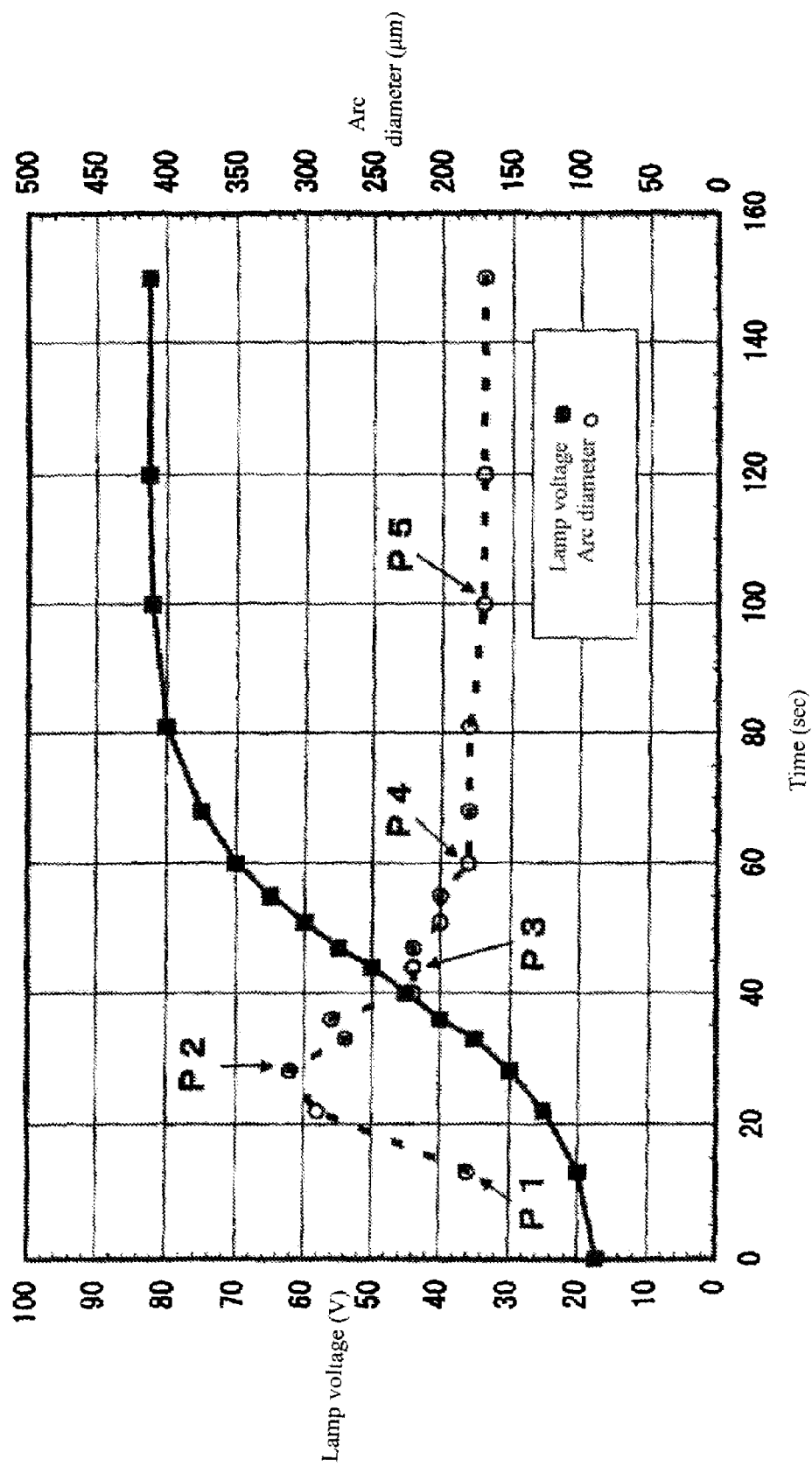
FIG. 6 is a graph of voltage characteristics from an experiment concerning this invention.

FIG. 6 shows the results of the measurements taken in this second experiment.

FIG. 6 shows changes in lamp voltage and discharge arc diameter with the passage of time from the beginning of discharge. The left vertical axis shows lamp voltage (V), the right vertical axis shows arc diameter (μm), and the horizontal axis shows the passage of time from the beginning of discharge (seconds). From the drawing, it can be seen that the discharge arc diameter is small immediately after the beginning of discharge and increases with time until a maximum value is reached. After that, as the mercury vapor pressure continues to increase, the arc diameter is constricted and arrives at the state of steady state operation. Specifically, the point that could be observed most quickly after the beginning of discharge was P1, after the passage of 13 seconds when the arc diameter was 180 μm; at P2 after 28 seconds the arc diameter was at the maximum value of 310 μm, after which the arc diameter decreased to 220 μm at P3 after 45 seconds when the lamp voltage reached 50 V. Then, at P4 after 50 seconds, when the switch was made to constant power control, the arc diameter was 200 μm, and at P5 after 100 seconds, the arc diameter had fallen further and settled at a fixed value of 170 μm.

Here, the switch from the first control period (T1) to the second control period (T2) can be specified in terms of arc diameter as the standard. That is because the previous experiment led to the conclusion that the timing of the switch from the first control period (T1) to the second control period (T2) is preferably when the lamp voltage reaches 50 V, without regard to lamp specifications. Thus, once the discharge arc has spread to the maximum extent and the arc diameter has reached its maximum value, the arc diameter tends to be constricted in inverse proportion to the rise of lamp voltage.

Specifically, it can be said that switching over became possible when the arc diameter was 220 μm. That is to say, that switching over became possible at the point in time when the arc diameter was smaller than the average of the maximum arc diameter (Dti-max) during the constant current control period (Ti) and the arc diameter (Dtw) during the constant power control period (Tw).

Now, because the arc diameter is still in the process of constricting at the beginning of the constant power control period (Tw), it is necessary to adopt the arc diameter at a point after transition to the constant power control period (Tw), when the lamp voltage and arch diameter have settled down, as the arc diameter (Dtw) of the constant power control period. This can be said to be about 2 minutes from the beginning of discharge.

Thus, in the invention of this application, the distinction between the first control period (T1) and the second control period (T2) is based on constriction of the discharge arc. Then, the lamp voltage is specified in addition to specifying the diameter of the discharge arc, with constriction of the discharge arc being the basic standard.

Here, an arc spot is formed between the electrodes prior to constriction of the discharge arc. In other words, the arc spot is formed between the electrodes, after which the arc is constricted.

In the electrodes having projections at the tips of the massive portions in the invention of this application, there is thermal conduction from the projections to the massive portions at the stage of arc spot formation, and so the projections do not become enough to melt or deform. Then, when the sealed in mercury vaporizes and the lamp voltage rises, the temperature of the discharge arc also rises and emission from the discharge arc increases. In this state, while the same current continues to flow, the possibility arises that the projections with melt or deform.

For that reason, in accordance with the invention of this application, the current value is reduced, not at formation of the arc spot, but afterwards when the discharge arc is constricted.

As explained above, in the constant current control period (Ti) from the beginning of discharge until the switch to constant power control (Tw) when the lamp voltage (VL) reaches the specified voltage, a current value (I2) is supplied that is larger than the maximum current (Itw-max) during the constant power control period (Tw) until the lamp voltage (VL) reaches 50 V) or until the discharge arc diameter is constricted to less than the average of the maximum value of the discharge arc diameter (Dti-max) and the arc diameter (Dtw) during the constant power control period (Tw). After that, in the second control period (T2), until the change to constant power control (Tw), a current smaller than the maximum current (Itw-max) on the constant power control period (Tw) is supplied. However, this means, it is possible to prevent melting and deformation of the electrode tip projections and to shorten the luminous flux rise time.

What is claimed is:

1. High pressure discharge lamp lighting device comprising:

a high pressure discharge lamp having a pair of electrodes that have massive portions with tips that face each other across a gap of no more than 2.0 mm within a light emitting part in which are sealed at least 0.20 mg/mm$^3$ of mercury and a halogen in the range of $10^{-6}$ μmol/mm$^3$ to $10^{-2}$ μmol/mm$^3$, and a power supply device that is adapted to feed alternating current to the discharge lamp of different current values, wherein the power supply device feeds the alternating current to the discharge lamp in a manner such that a constant current control period (Ti) from initial discharge until a transition to a constant power control period (Tw) has a first control period (T1) until the diameter of the discharge arc begins to be constricted and a second control period (T2) from the point when the diameter of the discharge arc begins to be constricted until transition to the constant power control period (Tw), wherein the power supply device is adapted to feed a current to the high pressure discharge lamp during the first control period (T1) that has a first value (I1) which is greater than a maximum current value (Itw-max) fed during the constant power control period (Tw), and wherein the power supply device is adapted to feed a current to the high pressure discharge lamp that has a second value (I2) during the second control period that is less than the maximum current value (Itw-max) fed during the constant power control period (Tw).

2. High pressure discharge lamp lighting device as described in claim 1 in which the first control period (T1) is the period until a discharge arc diameter is constricted to a value that is an average of a maximum value of the discharge arc diameter during the first control period (Dti-max) and the discharge arc diameter during the constant power control period (Dtw).

3. High pressure discharge lamp lighting device as described in claim 2, wherein the second value (I2) of the current has a value not exceeding 95% of the maximum current (tw-max) supplied during the constant power control period (Tw).

4. High pressure discharge lamp lighting device as described in claim 1, wherein the first control period (T1) is the period until the lamp voltage reaches a designated value.

5. High pressure discharge lamp lighting device as described in claim 4, wherein the first control period (T1) is the period until the lamp voltage reaches 50 V.

6. High pressure discharge lamp lighting device as described in claim 5, wherein the second value (I2) of the current has a value not exceeding 95% of the maximum current (tw-max) supplied during the constant power control period (Tw).

7. High pressure discharge lamp lighting device as described in claim 4, wherein the second value (I2) of the current has a value not exceeding 95% of the maximum current (tw-max) supplied during the constant power control period (Tw).

8. High pressure discharge lamp lighting device as described in claim 1, wherein the second value (I2) of the current has a value not exceeding 95% of the maximum current (tw-max) supplied during the constant power control period (Tw).

* * * * *